United States Patent
Muurinen

(10) Patent No.: US 11,177,699 B2
(45) Date of Patent: Nov. 16, 2021

(54) METHOD FOR DETERMINING AN EXECUTION FREQUENCY OF A FOREIGN OBJECT DETECTION METHOD

(71) Applicant: Nokia Technologies Oy, Espoo (FI)

(72) Inventor: Jari Muurinen, Perniö (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/317,268

(22) PCT Filed: May 12, 2015

(86) PCT No.: PCT/FI2015/050319
§ 371 (c)(1),
(2) Date: Dec. 8, 2016

(87) PCT Pub. No.: WO2015/189459
PCT Pub. Date: Dec. 17, 2015

(65) Prior Publication Data
US 2017/0149293 A1 May 25, 2017

(30) Foreign Application Priority Data
Jun. 13, 2014 (FI) .................................... 20145560

(51) Int. Cl.
*H02J 50/10* (2016.01)
*H02J 50/60* (2016.01)
*H02J 7/02* (2016.01)
*H02J 50/12* (2016.01)
*H02J 50/05* (2016.01)

(52) U.S. Cl.
CPC .............. *H02J 50/60* (2016.02); *H02J 7/025* (2013.01); *H02J 50/10* (2016.02); *H02J 50/05* (2016.02); *H02J 50/12* (2016.02)

(58) Field of Classification Search
USPC ......................................................... 307/104
See application file for complete search history.

(56) References Cited

U.S. PATENT DOCUMENTS

| | | | |
|---|---|---|---|
| 8,620,484 B2 | 12/2013 | Baarman et al. | |
| 8,836,273 B2 * | 9/2014 | Yoda ...................... | H02J 7/025 320/105 |
| 2009/0127936 A1 | 5/2009 | Kamijo et al. | |

(Continued)

FOREIGN PATENT DOCUMENTS

| | | |
|---|---|---|
| CN | 101930047 A | 12/2010 |
| CN | 101981780 A | 2/2011 |

(Continued)

OTHER PUBLICATIONS

International Search Report and Written Opinion received for corresponding Patent Cooperation Treaty Application No. PCT/FI2015/050319, dated Sep. 22, 2015, 9 pages.

(Continued)

*Primary Examiner* — Toan T Vu
*Assistant Examiner* — Xuan Ly

(57) ABSTRACT

The invention relates to a method, comprising: determining a power level value of transmitted wireless energy, and adjusting a foreign object detection method frequency on the basis of said power level value of the transmitted wireless energy. The invention further relates to an apparatus and a computer program product that perform the method.

15 Claims, 4 Drawing Sheets

(56) References Cited

U.S. PATENT DOCUMENTS

| | | |
|---|---|---|
| 2010/0118677 A1 | 5/2010 | Fushimi et al. |
| 2010/0225173 A1 | 9/2010 | Aoyama et al. |
| 2011/0128015 A1 | 6/2011 | Dorairaj et al. |
| 2011/0140538 A1* | 6/2011 | Jung .............. H02J 7/0013 307/104 |
| 2012/0077537 A1 | 3/2012 | Muratov et al. |
| 2012/0153742 A1 | 6/2012 | Lee et al. |
| 2013/0257168 A1 | 10/2013 | Singh |
| 2014/0103869 A1 | 4/2014 | Radovic et al. |
| 2014/0111154 A1* | 4/2014 | Roy ................ G01V 3/081 320/108 |
| 2014/0239732 A1* | 8/2014 | Mach .............. H04B 5/0037 307/104 |
| 2014/0266036 A1* | 9/2014 | Jung ................ H02J 50/12 320/108 |

FOREIGN PATENT DOCUMENTS

| | | |
|---|---|---|
| CN | 102763306 A | 10/2012 |
| CN | 103765728 A | 4/2014 |
| JP | 2013/541313 A | 11/2013 |
| JP | 2013-541313 A | 11/2013 |
| JP | 2014-505455 A | 2/2014 |
| WO | 2009/081115 A1 | 7/2009 |
| WO | 2009081115 | 7/2009 |
| WO | WO2009/081115 * | 7/2009 |
| WO | WO 2009/081115 * | 7/2009 |
| WO | WO2009081115 * | 7/2009 |
| WO | 2009/105595 A1 | 8/2009 |
| WO | 2012/040530 A2 | 3/2012 |
| WO | 2013/056234 A2 | 4/2013 |
| WO | 2014/060871 A1 | 4/2014 |
| WO | 2014057343 A1 | 4/2014 |
| WO | 2014060871 A1 | 4/2014 |
| WO | 205189459 A1 | 12/2015 |
| WO | 2015189459 A1 | 12/2015 |

OTHER PUBLICATIONS

Final Office action received for corresponding U.S. Appl. No. 14/728,450, dated Nov. 3, 017, 8 pages.
Non-Final Office action received for corresponding U.S. Appl. No. 14/728,450, dated May 17, 2017, 10 pages.
Office action received for corresponding Japanese Patent Application No. 2016-571286, dated Sep. 7, 2017, 3 pages of office action and 3 pages of office action translation available.
Office action received for corresponding Finnish Patent Application No. 20145560, dated Dec. 2, 2014, 5 pages.
Office action received for corresponding Finnish Patent Application No. 20145561, dated Dec. 16, 2014, 8 pages.
Hui, "Planar Wireless Charging Technology for Portable Electronic Products and Qi", Proceedings of the IEEE, vol. 101, No. 6, Jun. 2013, pp. 1290-1301.
Extended European Search Report received for corresponding European Patent Application No. 15168559.1, dated Oct. 23, 2015, 7 pages.
"System Description Wireless Power Transfer", Wireless Power Consortium, vol. 1: Low Power, Part 1: Interface Definition, Version 1.1.2, Jun. 2013, 186 pages.
Mar. 2, 2018—(JP) Decision of Rejection—App 2016-571286—Eng Trans.
Aug. 13, 2018—(EP) Office Action—App 15168559.1.
Wireless Power Consortium: "System description wireless power transfer, vol. 1: Low power, Part 1: Interface definitiion, Version 1.1.2", Jun. 1, 2013.
Jun. 4, 2018—(CN) First Office Action—App 201580029788.1.
Feb. 19, 2019—(CN) Second Office Action—App 201580029788.1.

* cited by examiner

METHOD FOR DETERMINING AN EXECUTION FREQUENCY OF A FOREIGN OBJECT DETECTION METHOD

RELATED APPLICATION

This application was originally filed as PCT Application No. PCT/FI2015/050319 filed May 12, 2015 which claims priority benefit from Finnish Patent Application No. 20145560, filed Jun. 13, 2014.

A method for determining an execution frequency of a foreign object detection method.

BACKGROUND

Electromagnetic induction has been known for a long time and it has been used in many applications. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from a circuit to another via inductively coupled coils. A primary coil transforms an alternating current into a varying magnetic flux, which is arranged to flow through the secondary coil. The varying magnetic flux then induces an alternating voltage over the secondary coil.

Wireless charging is an application where electromagnetic induction is used to transfer energy over air. A wireless charging system comprises a charger device i.e. a WLC transmitter with a primary coil, and a device to be charged, receiver device, i.e. a WLC receiver with a secondary coil. The current in the charger device is transferred to the receiver device through these electromagnetically coupled coils, and the induced current may be further processed and used to charge the battery of the charged device. Energy is transmitted through inductive coupling from the charger device to the charged device, which may use that energy to charge batteries or as direct power. The wireless charger device comprises a charging area, onto which the receiver device is arranged to receive wireless energy from the charger device. Other unwanted metallic foreign object(s) in that charging area during the wireless energy transmission may, however, heat up and cause safety hazards in addition to power losses.

SUMMARY

Now there has been invented an improved method and technical equipment implementing the method, by which the above problems are alleviated. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method, comprising determining a power level value of transmitted wireless energy, and adjusting a foreign object detection method frequency on the basis of said power level value of the transmitted wireless energy.

According to an embodiment, the foreign object detection method frequency is increased as a function of said power level value of the transmitted wireless energy. According to an embodiment, the foreign object detection method frequency is increased linearly, exponentially or progressively. According to an embodiment, increasing the foreign object detection frequency comprises shortening a time interval between adjacent foreign object detections. According to an embodiment, said power level of the transmitted wireless energy is derived from a second power level value received from a wireless energy receiver.

According to a second aspect, there is provided an apparatus comprising at least one processor, memory including computer program code, the memory and the computer program code configured to, with the at least one processor, cause the apparatus to perform at least the following: determine a power level value of the transmitted wireless energy, and adjust a foreign object detection method frequency on the basis of said power level value of the transmitted wireless energy.

According to an embodiment, the foreign object detection method frequency is increased grows as a function of said power level value of the transmitted wireless energy. According to an embodiment, the foreign object detection method frequency is increased grows linearly, exponentially or progressively. According to an embodiment, increasing the foreign object detection frequency comprises shortening a time interval between adjacent foreign object detections. According to an embodiment, said power level of the transmitted wireless energy is derived from a second power level value received from a wireless energy receiver.

According to a third aspect, there is provided an apparatus comprising: means for determining a power level value of the transmitted wireless energy, and means for adjusting a foreign object detection method frequency on the basis of said power level value of the transmitted wireless energy.

According to a fourth aspect, there is provided a computer program product embodied on a non-transitory computer readable medium, comprising computer program code configured to, when executed on at least one processor, cause an apparatus to: determine a power level value of the transmitted wireless energy, and adjust a foreign object detection method frequency on the basis of said power level value of the transmitted wireless energy.

According to an embodiment, the foreign object detection method frequency grows as a function of said power level value of the transmitted wireless energy. According to an embodiment, the foreign object detection method frequency grows linearly, exponentially or progressively. According to an embodiment, increasing the foreign object detection frequency comprises shortening a time interval between adjacent foreign object detections. According to an embodiment, said power level of the transmitted wireless energy is derived from a second power level value received from a wireless energy receiver.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
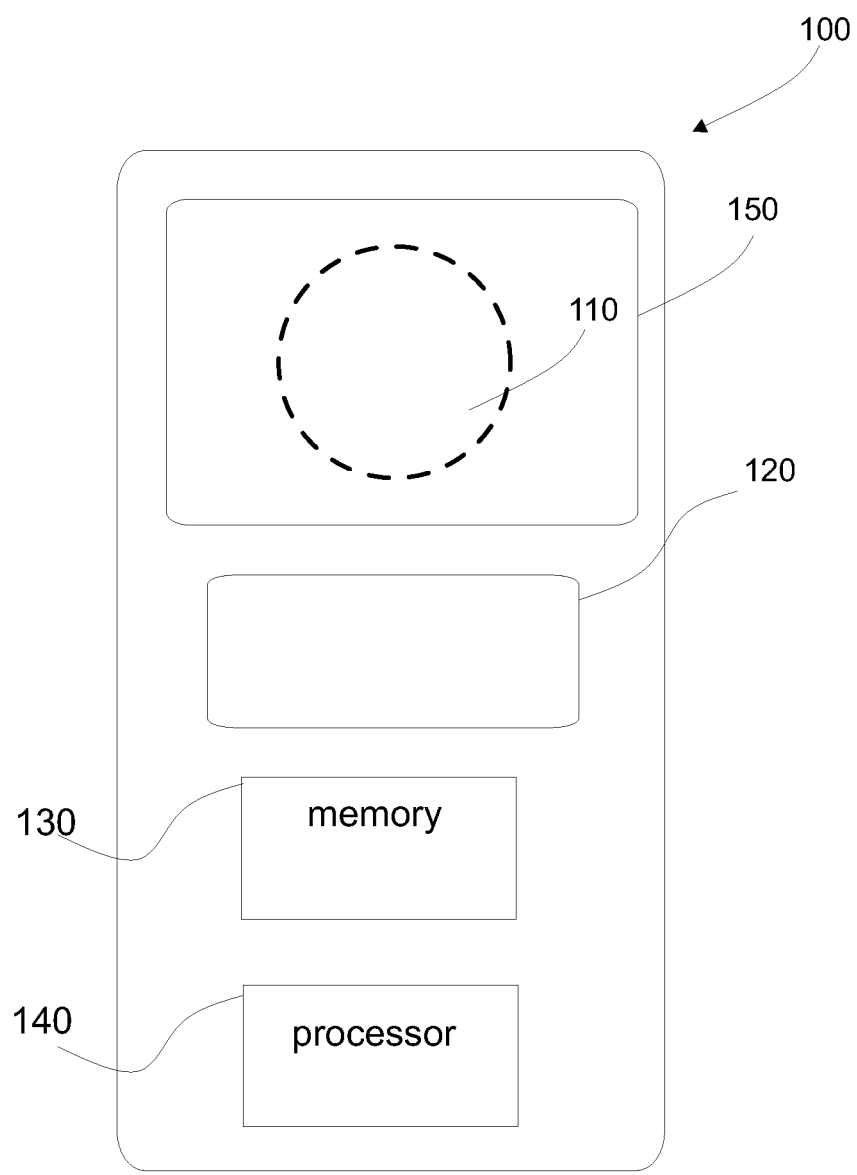
FIG. 1 shows an example of a device according to an embodiment.

In the following, several embodiments of the invention will be described in the context of a wireless energy receiver device, for example, a wireless charging (WLC) receiver and a wireless energy charger device i.e. a WLC transmitter, transmitting wireless energy for the receiver device. It is to be noted that different embodiments may have applications widely in any environment where an apparatus is suitable to transfer wireless energy. In embodiments, the wireless energy charger device may be used to transfer wireless energy to a wireless energy receiver device wirelessly and therefore the wireless energy charger device, as described throughout the specification, may be generally referred to as a WLC transmitter. In addition, in embodiments, the wireless energy receiver device may be used to receive wireless energy from a WLC transmitter wirelessly and therefore the wireless energy receiver device, as described throughout the specification, may be generally referred to as a WLC receiver.

The WLC transmitter comprising a primary WLC coil is suitable to transmit wireless energy by inductive coupling or magnetic resonance, i.e., by an inductive energy link to a WLC receiver comprising a secondary WLC coil. The WLC receiver may be, for example, a mobile phone, a mobile computer, a mobile collaboration device, a mobile internet device, a smart phone, a tablet computer, a tablet personal computer (PC), a personal digital assistant, a handheld game console, a portable media player, a digital still camera (DSC), a digital video camera (DVC or digital camcorder), a pager, or a personal navigation device (PND). The WLC transmitter may also be implemented in objects suitable for charging such devices, e.g., a hand bag, pillow, table, cloth etc. In some embodiments, wireless power or energy transfer may comprise capacitive coupling with the transmitter and the receiver.

Wireless power transfer, e.g. wireless charging, process may comprise four phases: selection, ping, identification & configuration, and power transfer.

In the selection phase, the WLC Transmitter may monitor the charging area for the placement and removal of objects, for example, a WLC receiver. This phase may be also called the analog ping. The term "charging area" may refer to an interface surface, onto which the WLC transmitter transfers wireless energy to a WLC receiver. In general, the term "charging area" refers to any location with respect to the WLC transmitter, where wireless power transfer from the WLC transmitter to a WLC receiver is possible.

In the ping phase, the transmitter may execute a Digital Ping, and listen for a response. The WLC transmitter may apply a power signal and detect whether the WLC receiver modulates the power signal to send a Signal Strength Packet. Modulation of the power signal may be implemented for example by load modulation where an additional load is switched on and off to change the power drawn from the WLC transmitter. Communication between the WLC transmitter and WLC receiver may be also implemented using another communication path, e.g., a short-range radio link such as Bluetooth.

In the identification & configuration phase, the WLC transmitter may identify the selected WLC receiver, and obtain configuration information such as the maximum amount of power that the WLC receiver intends to provide at its output. The WLC transmitter uses this information to create a Power Transfer Contract.

In the power transfer phase, the WLC transmitter may continue to provide power to the WLC receiver, adjusting the power level in response to control data (Control Error Packets) received from the WLC Receiver. WLC receiver may report the received power by sending at least one Rectified Power Packet to the WLC transmitter. Throughout this phase, the WLC transmitter may monitor the parameters that are contained in the Power Transfer Contract (e.g. the maximum received power). A violation of any of the stated limits on any of those parameters may cause the WLC transmitter to abort the power transfer.

During the power transfer phase the transmitter may also perform foreign object detection (FOD) method(s), e.g., by comparing the received power to the transmitted power as described above. In the FOD method the WLC receiver may report the received power to the WLC transmitter and the WLC transmitter may compare the received power to the transmitted power. By the FOD method the WLC transmitter may discover if an unwanted metallic foreign object(s) (FO) is/are on a charging area of the WLC transmitter or in proximity of the charging area in addition to the WLC receiver. As foreign objects in this context can count all other metal objects than power receiving means, for example, a secondary coil(s) of the WLC receiver used to receive the wireless energy. Unwanted metallic foreign object(s) on the charging area during power transmission may heat and may therefore increase power consumption i.e. power losses. In addition, heating of the unwanted metallic foreign object(s) on the charging area during power transmission may cause safety hazards. If any unwanted metallic foreign object(s) is placed on or in the proximity of the charging area, current is induced into the unwanted metallic foreign object(s). This may result in heating of the unwanted metallic foreign object(s) and damages the unwanted metallic foreign object(s) and may also cause a fire accident.

Current low power WLC devices/systems use closed-loop foreign object detection (FOD) methods (compare RX power to TX), but these are not accurate enough in high power transmission, for example, around 5 W or above. There exist some foreign object detection (FOD) method(s) that are accurate enough, but they may only be applied when there is no power transfer (TX) ongoing. This is the case, for example, if the Q-factor of a receiver of a transmitter coil is used to detect foreign objects (FO's). Q-factor can be measured, for example, by measuring the length of the self-ringing of an RC circuit after applying an energy pulse to it. When power transfer is not allowed during a FOD method, the power transfer needs to be paused once in a while to perform a FOD cycle in order to detect a foreign object(s) (FO(s)) which may have arrived to the magnetic field i.e. onto a charging area or in proximity of the charging area. Dangerousness of foreign object(s) on the charging area or in proximity of the charging area depend on the transferred power (TX); higher power is more dangerous than the lower; when higher power has been transmitted, foreign object(s) can reach high temperature faster than in the case of lower power, which high temperature may cause above mentioned damages and/or fire accidents. Therefore, for this reason, it may be more appropriate to perform loop foreign object detection (FOD) methods more frequently when transferred power (TX) level is high than when it is low. Performing of foreign object detection (FOD) methods more frequently i.e. increasing the foreign object detection frequency comprises shortening a time interval between adjacent foreign object detections. In other words, FOD detection interval could be proportional to the power transmitted; it is possible to safely use a longer FOD interval i.e. lower FOD detection frequency when TX power is low and a shorter FOD interval i.e. higher FOD detection frequency when TX power is high. This improves the power transfer efficiency since the power transfer does not need to be interrupted so often, when there is no need for so frequently done FOD detections.

FOD interval and thus FOD detection frequency may be further adapted based on power loss in the WLC system. If power loss of the WLC system is in a range which is considered safe, for example, under a threshold value arranged for it, a longer FOD interval may be used.

The FOD detection frequency and length of the interval between adjacent FODs may depend on the TX power, for example, linearly. Other possible scales for FOD detection frequency may be, for example, exponential change, logarithmic change or any other desired change. In these cases, the FOD detection frequency may be increased as a function of the TX power level value linearly, exponentially or logarithmically. It is also possible that the TX power is divided into a plurality of power level ranges, so that the FOD detection frequency is increased as a function of TX power level value progressively, step by step. Each range of TX power may correspond to a different FOD detection frequency and/or different length of FOD detection interval. Number of power level ranges can also be freely selected, as well as the durations of the FOD intervals. In addition, different ranges of power level may correspond to different FOD intervals. The TX power may be split, for example, in four so that the first power level range, e.g. 0 W-1 W, has a FOD detection interval of 10 seconds, the second power level range, e.g. 1 W-3 W, has a detection interval of 3 seconds, the third power level range, e.g. 3 W-5 W, has a detection interval of 1 seconds, and the last range, e.g. 5 W-10 W, of the TX power has a detection interval of 0.5 seconds.

The FOD detection frequency may be determined by any suitable way as long as FOD detection frequency i.e. length of intervals is arranged to be longer near the 0 W of TX power and shorter at higher TX power level. In other words, detection of foreign object(s) is more relevant in a high amount of power transfer than in a low amount of power transfer, the FOD detection frequency may be lower for a WLC transmitter/system using low power in wireless charging compared to a WLC transmitter/system using high power in wireless charging.

In the following, several embodiments will be described in the context of FIGS. 1 through 4 of the drawings. It is to be noted, however, that embodiments should not be understood as limiting examples.

FIG. 1 shows an example of a device 100 with circuitry 110 for determining a FOD execution frequency implemented as an additional function for the device 100. It should be understood, however, that the device 100 as illustrated and hereinafter described is merely illustrative of one type of a charger device i.e. a WLC transmitter with a primary coil 120 that may benefit from various embodiments, and therefore should not be taken to limit the scope of the embodiments. As such, it should be appreciated that at least some of the components described below in connection with the device 100 may be optional and thus, in an example embodiment may include more, less or different components than those described in connection with the example embodiment of FIG. 1.

The device 100 comprises a memory 130 configured to store computer program code used for a FOD execution frequency determining method. The device 100 comprises a processor 140 that executes the program code to perform the device's functionality. In addition, the device 100 comprises a charging area 150 for a power receiver. There is a WLC primary coil 110, a wireless charging coil, which is suitable to charge power receivers comprising at least one WLC secondary coil for receiving the energy wirelessly when power receivers are arranged/attached onto the charging area 150. However, it is also possible that there is more than one WLC primary coils in addition to the coil 110. The device 100 may further have display, touch-screen one or more physical buttons or one or more touch-screen buttons (not shown). The device 100 may further comprise a keypad being provided either on the display as a touch-screen keypad or on the housing of the apparatus as a physical keypad (not shown). The device 100 may further comprise a microphone and loudspeaker (not shown) to receive and to transmit audio. The device 100 may also comprise a communication interface (not shown) configured to connect the apparatus to another device, via wireless and/or wired network, and to receive and/or transmit data by said wireless/wired network. Wireless communication can be based on any cellular or non-cellular technology, for example GSM (Global System for Mobile communication), WCDMA (Wideband Code Division Multiple Access), CDMA (Code Division Multiple Access). Wireless communication can also relate to short range communication such as Wireless Local Area Network (WLAN), Bluetooth etc. The device 100 may further comprise an input/output element to provide e.g. user interface views to the display. Further the device 100 may comprise a loudspeaker to provide audio messages for user. It is also possible that the device 100 comprises some sensors. The electrical connections inside the device 100 are not shown.

Figure 2:
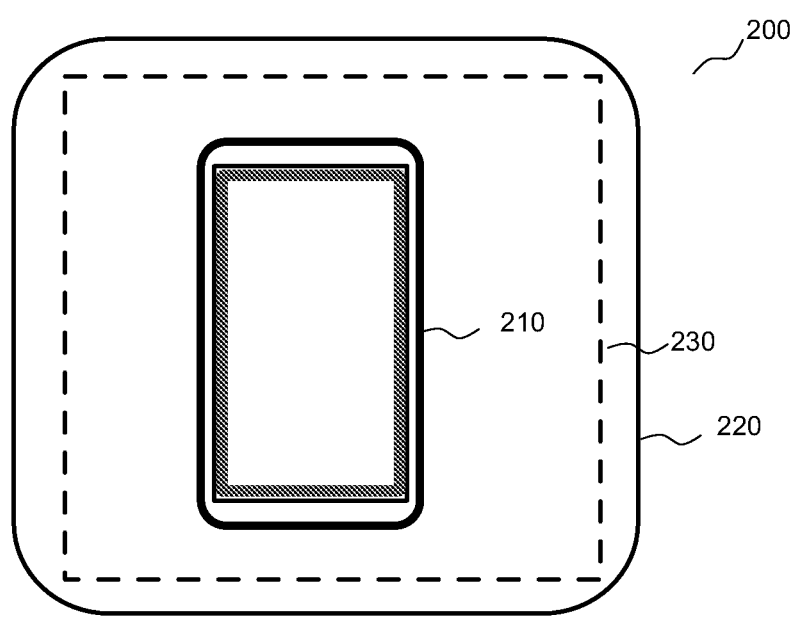
FIG. 2 shows an example of WLC system according to an embodiment.

FIG. 2 shows a WLC system according to an embodiment. The WLC system 200 comprises a WLC receiver 210 and a WLC transmitter 220. The WLC receiver 210 is arranged onto a charging area 230 of the WLC transmitter 220 while charging. The type of the WLC transmitter 220 or charging area 230 is not restricted to the shown embodiment. The WLC transmitter 220 is configured to perform a FOD method(s) to determine if there are metallic foreign object(s) on the charging area 230. The WLC transmitter 220 is arranged to determine the TX power i.e. transmitted power transmitted by the WLC transmitter 220. The used TX power may be determined so that the WLC receiver 210 may determine a power level, for example, the maximum TX power, a desired TX power, or actual received power and communicate this power level to the WLC transmitter 220. WLC receiver 220 may also send a request to adjust, i.e. increase or decrease, the TX power.

The WLC transmitter 220 may then derive power level of the transmitted wireless energy (TX power) from the power level value or the adjustment request transmitted/communicated to WLC transmitter 220 by the WLC receiver 210. The used TX power may also be determined so that the WLC transmitter 220 is arranged to transmit a certain level of TX power for a certain type of the WLC receiver 210 i.e. the used TX power transmitted by the WLC transmitter 220 may depend on the type of the WLC receiver 210. It is also possible to use some other method for determining the TX power used for transmitting wireless energy by the WLC transmitter 220. On the basis of the used TX power the WLC transmitter 220 may adjust FOD execution frequency to correspond to that used TX power level.

Figure 3:
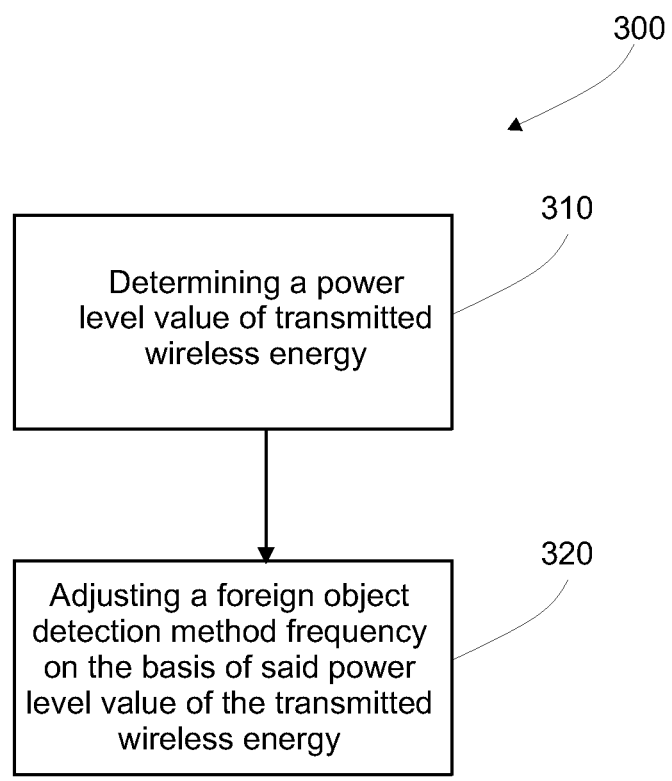
FIG. 3 shows an example of flow chart of a method for determining an execution frequency for a foreign object detection method of a WLC system/transmitter according to an embodiment.

FIG. 3 shows a flow chart of a method for determining an execution frequency for a foreign object detection method of a WLC system/transmitter according to an embodiment. In the method 300, in step 310, a power level value of transmitted wireless energy is determined, and in step 320 a foreign object detection method frequency is adjusted on the basis of said power level value of the transmitted wireless energy.

Figure 4A:
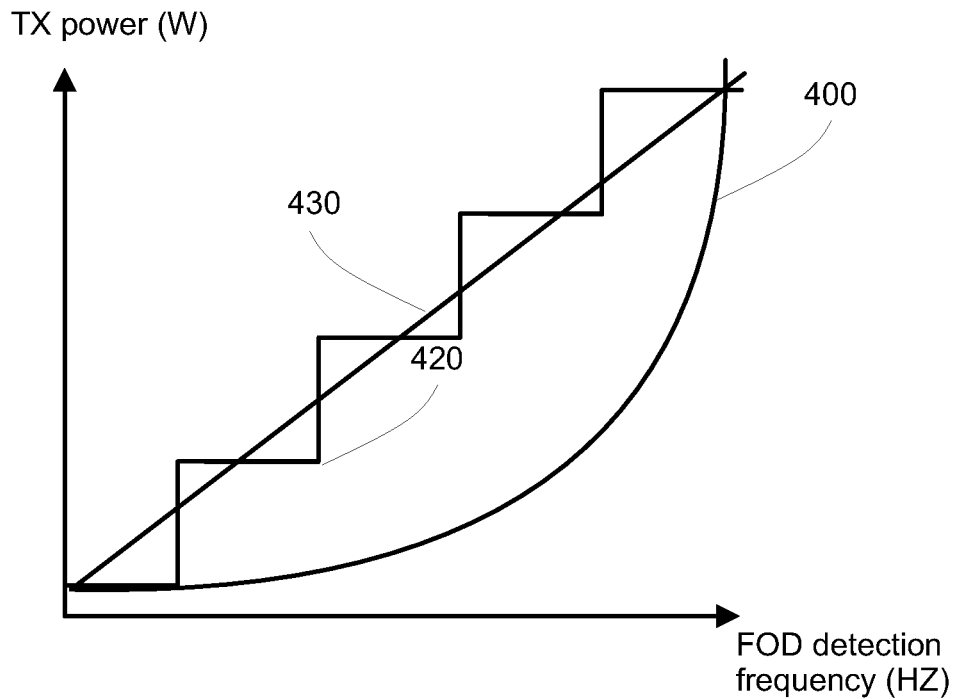
FIGS. 4a and b show some examples of FOD detection frequencies and lengths of intervals as a function of TX power according to an embodiment.

FIG. 4a shows some examples of FOD detection frequencies as a function of TX power according to an embodiment.

400 is an exponential graph of FOD frequency as a function of a TX power level, 420 is a periodic graph of FOD frequency as a function of a TX power level and 430 is a linear graph of FOD frequency as a function of a TX power level. In some example embodiments, the FO detection frequency may depend on the TX power by an increasing function. That is, when a WLC transmitter increases the TX power, it may also increase the FO detection frequency accordingly.

Figure 4B:
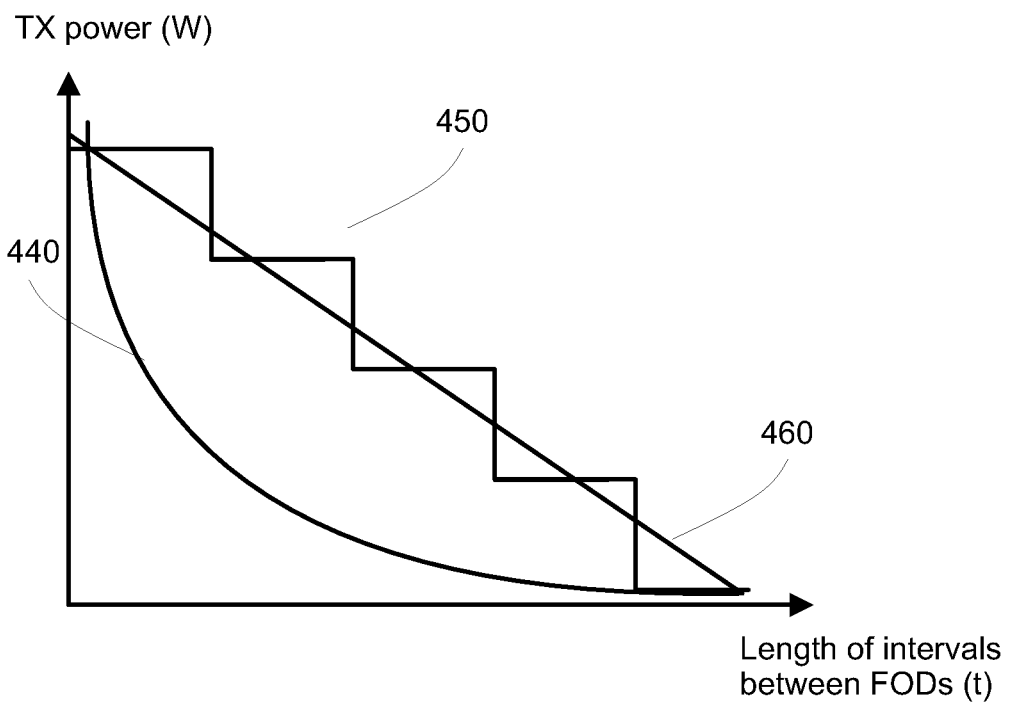

FIG. 4b shows some examples of lengths of intervals between adjacent FODs as a function of TX power according to an embodiment. 440 is an exponential graph of length of FOD intervals as a function of a TX power level, 450 is a periodic graph of length of FOD intervals as a function of a TX power level and 460 is a linear graph of length of FOD intervals as a function of a TX power level. In some example embodiments, the time interval between adjacent FO detections may depend on the TX power by a decreasing function. That is, when a WLC transmitter increases the TX power, it may also shorten the FO detection interval accordingly.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

It is obvious that the present invention is not limited solely to the above-presented embodiments, but it can be modified within the scope of the appended claims.

The invention claimed is:

1. A method, comprising:
   determining a power level value of transmitted wireless energy; and
   based on an increase of the power level value of the transmitted wireless energy, shortening a time interval between adjacent executions of a foreign object detection method, wherein the shortening the time interval includes increasing a frequency of the foreign object detection method as a function of said power level value of the transmitted wireless energy.

2. The method according to claim 1, wherein the frequency of the foreign object detection method is increased exponentially or progressively.

3. The method according to claim 1, further comprising:
   performing a second determination of the power level value; and
   based on a decrease of the power level value detected based on the second determination, increasing the time interval between the adjacent executions of the foreign object detection method.

4. The method according to claim 1, wherein said power level value of the transmitted wireless energy is derived from a second power level value received from a wireless energy receiver.

5. An apparatus comprising at least one processor, memory including computer program code, the memory and the computer program code configured to, with the at least one processor, cause the apparatus to:
   determine a power level value of transmitted wireless energy; and
   based on an increase of the power level value of the transmitted wireless energy, shorten a time interval between adjacent executions of a foreign object detection method on a basis of said power level value of the transmitted wireless energy and increase a frequency of the foreign object detection method as a function of said power level value of the transmitted wireless energy.

6. The apparatus according to claim 5, wherein the frequency of the foreign object detection method is increased linearly or progressively.

7. The apparatus according to claim 5, wherein the memory and the computer program code configured to, with the at least one processor, further cause the apparatus to:
   based on a decrease of the power level value of the transmitted wireless energy, increase the time interval between the adjacent executions of the foreign object detection method.

8. The apparatus according to claim 5, wherein said power level value of the transmitted wireless energy is derived from a second power level value received from a wireless energy receiver.

9. A computer program product embodied on a non-transitory computer readable medium, comprising computer program code configured to, when executed on at least one processor, cause an apparatus to:
   determine a power level value of transmitted wireless energy; and
   based on an increase of the power level value of the transmitted wireless energy, shorten a time interval between adjacent executions of a foreign object detection method on a basis of said power level value of the transmitted wireless energy and increase a frequency of the foreign object detection method as a function of said power level value of the transmitted wireless energy.

10. The computer program product according to claim 9, wherein the frequency of the foreign object detection method grows linearly or exponentially.

11. The computer program product according to claim 9, wherein the computer program code configured to, when executed on the at least one processor, further causes the apparatus to:
    based on a decrease of the power level value of the transmitted wireless energy, increase the time interval between the adjacent executions of the foreign object detection method.

12. The computer program product according to claim 9, wherein said power level value of the transmitted wireless energy is derived from a second power level value received from a wireless energy receiver.

13. The method according to claim 1, wherein the frequency of the foreign object detection method is increased linearly.

14. The apparatus according to claim 5, wherein the frequency of the foreign object detection method is increased exponentially.

15. The computer program product according to claim 9, wherein the frequency of the foreign object detection method grows progressively.

* * * * *